May 26, 1942.　　W. H. HOWE　　2,283,927
CONTROL APPARATUS
Filed Nov. 12, 1938　　4 Sheets-Sheet 4
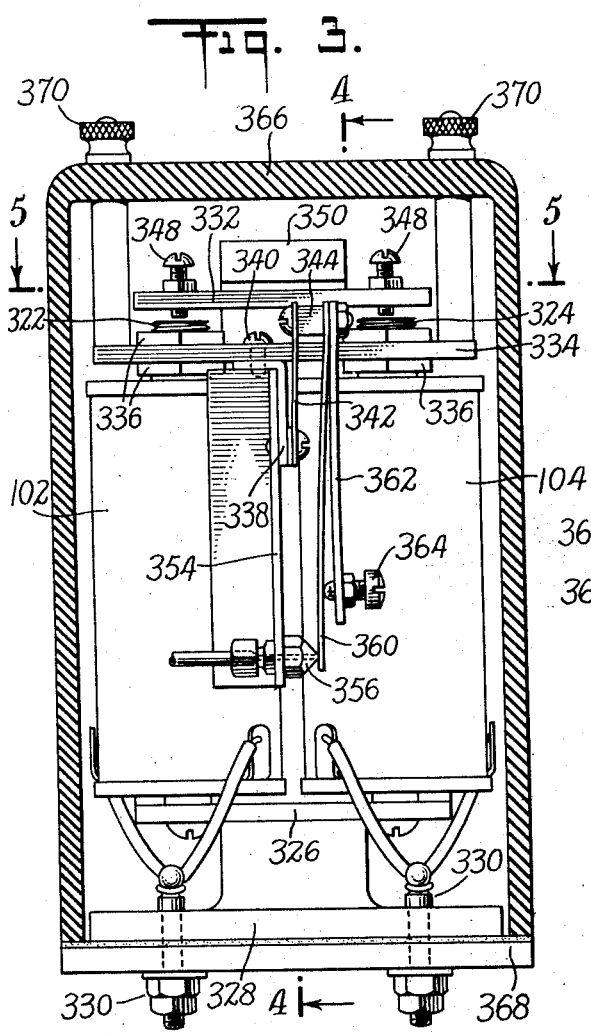
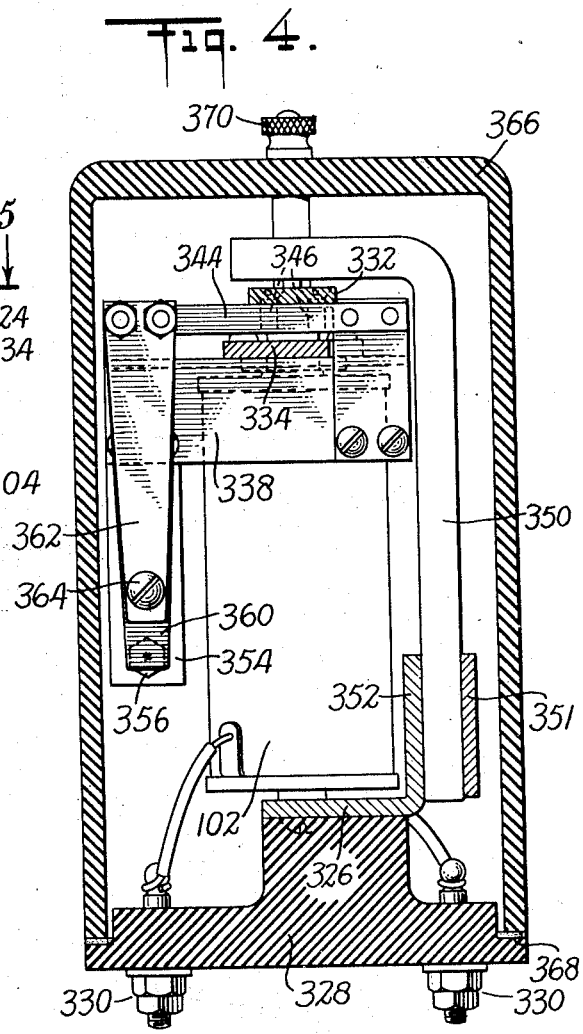
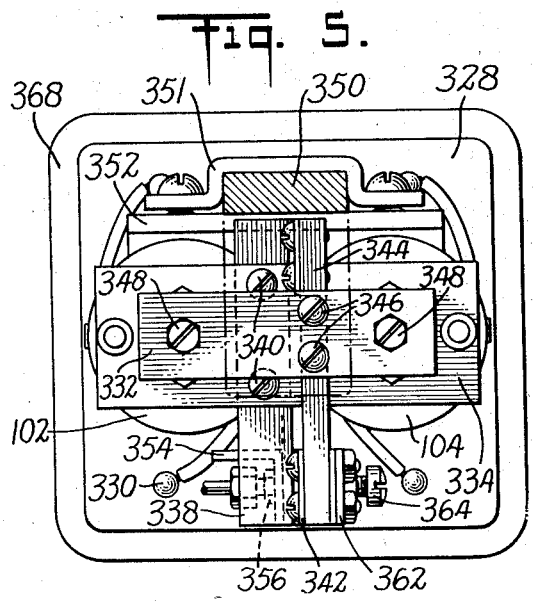
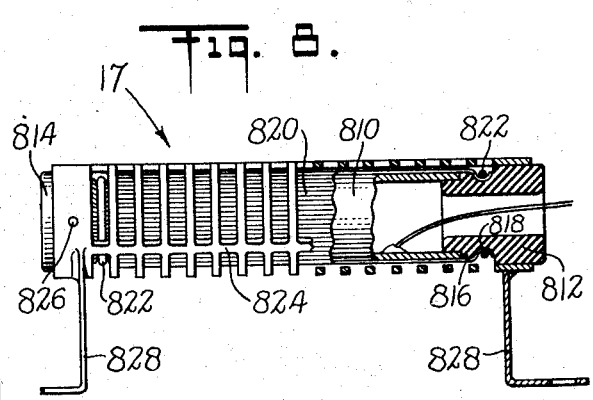
INVENTOR
Wilfred H. Howe
BY
Blair, Curtis, Dunne + Hayward
ATTORNEYS Patented May 26, 1942

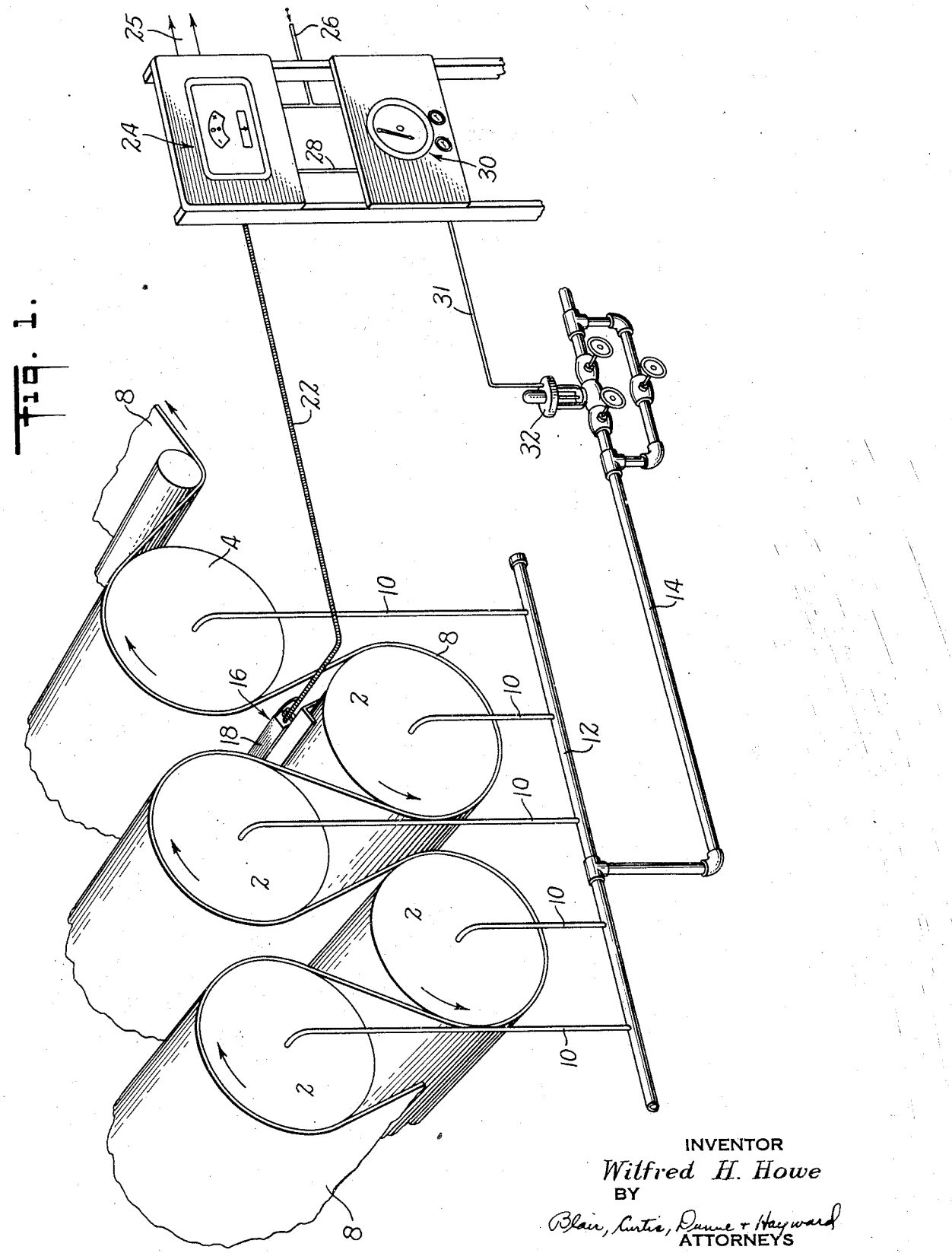

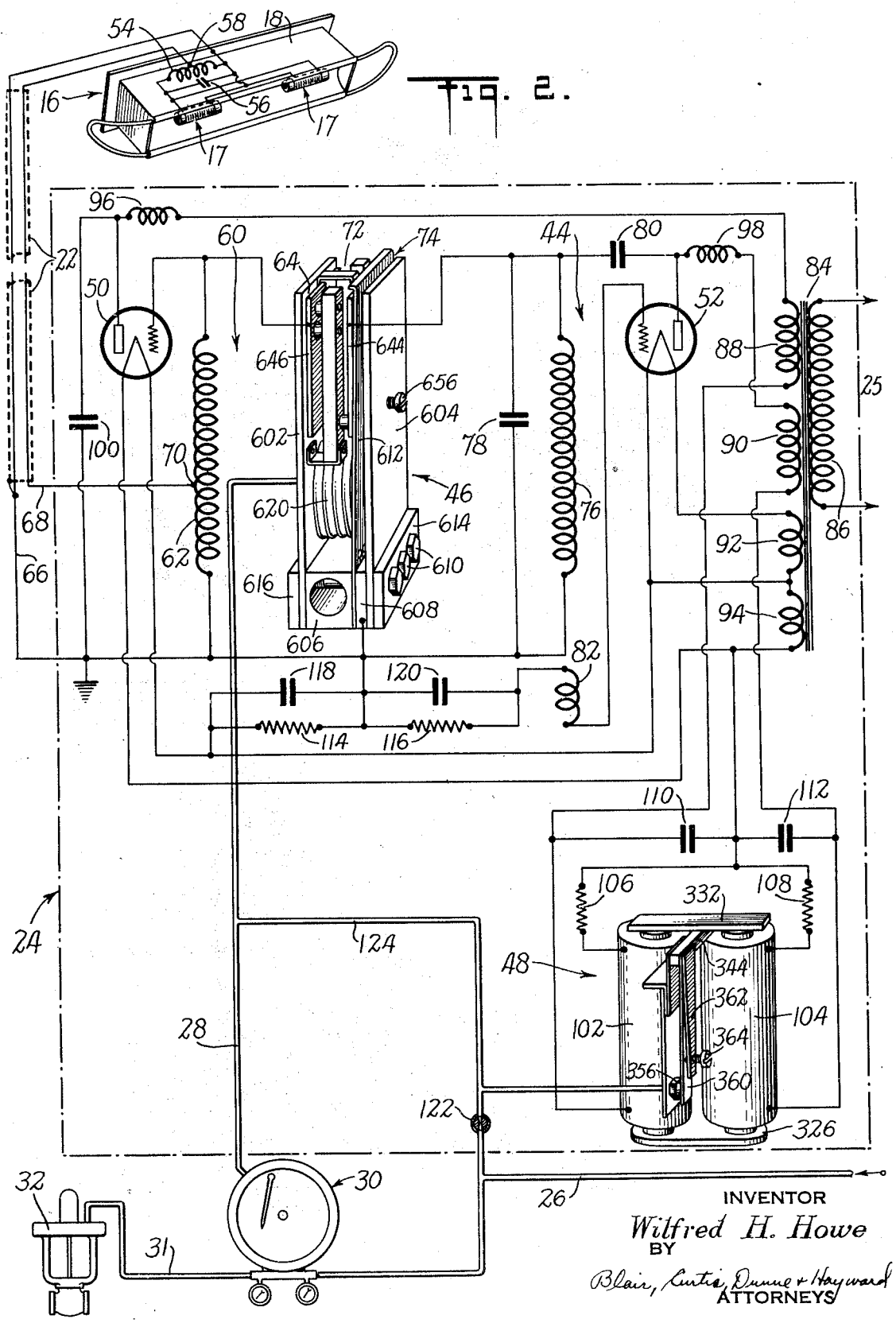

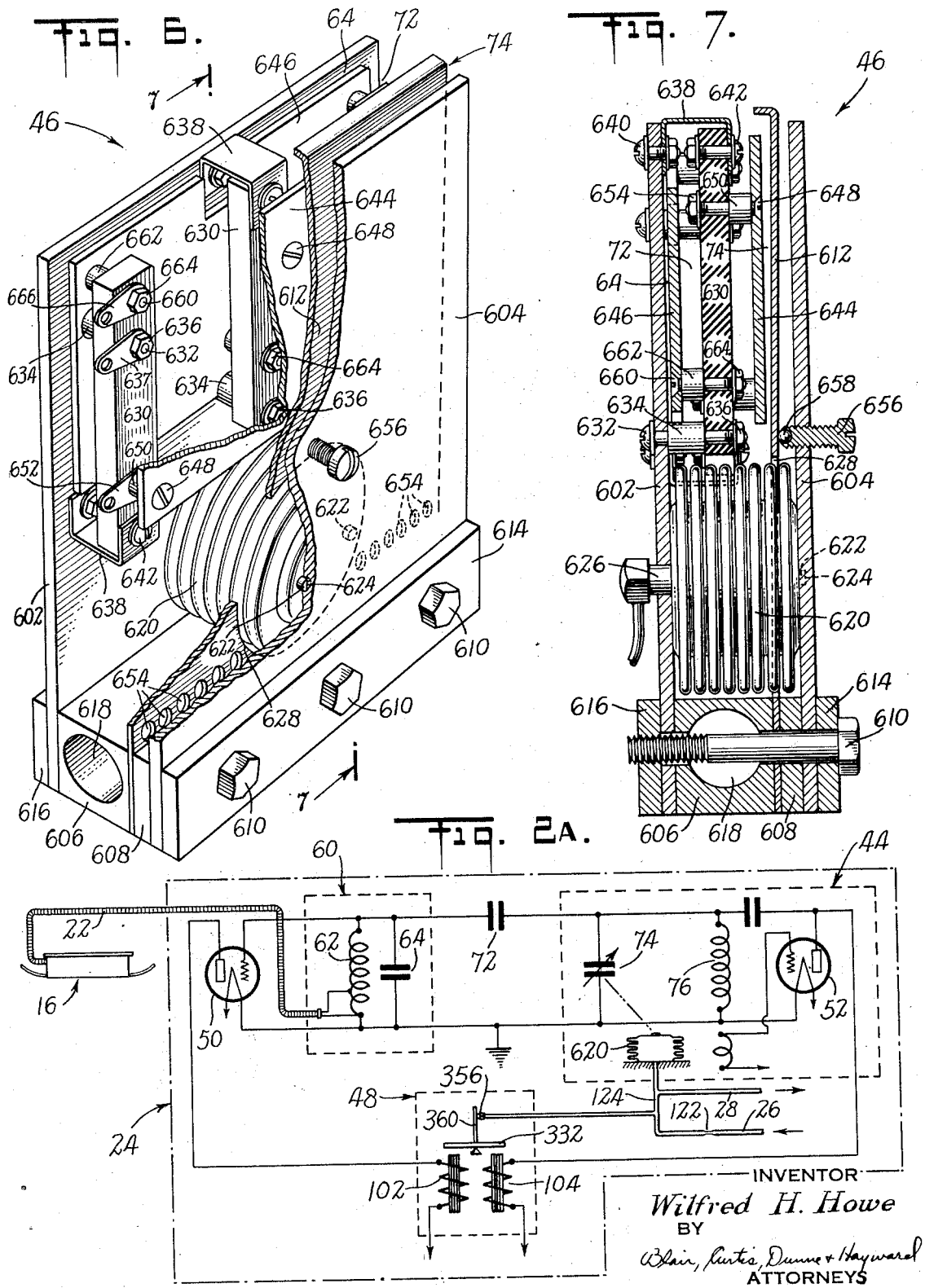

2,283,927

UNITED STATES PATENT OFFICE 2,283,927

CONTROL APPARATUS

Wilfred H. Howe, Sharon, Mass., assignor to The Foxboro Company, Foxboro, Mass., a corporation of Massachusetts Application November 12, 1938, Serial No. 240,002

25 Claims. (Cl. 236—84)

This invention relates to measuring and controlling apparatus, and more particularly to apparatus for continuously amplifying a small electrical value responsive to a condition being measured into a relatively large force value.

In the present embodiment such a small variable electrical value is translated into a pneumatic pressure continuously proportional to the electrical value. Such a pneumatic pressure may then be used to operate a simple pressure indicator or recorder, or to operate control apparatus influencing the value of the condition being measured.

Whereas apparatus is known for translating electrical values into air pressures, the present invention has simplified the problem and has made possible a more rapidly operating instrument with wider range of operation in which deadspace due to lost motion or friction has been largely eliminated.

It is an object of this invention, therefore, to provide such new and improved control apparatus. It is a further object of this invention to provide such apparatus which will permit rapid control of a condition with fluid pressure control apparatus in continuous and proportional response to an electrical value manifested by an electrical condition-sensitive means, and to provide pneumatically-operated follow-up mechanism for such apparatus which is substantially free from deadspace and friction.

These and other apparent advantages and objects of this invention are obtained by the means described in the following specification and may be more readily understood by reference to the accompanying drawings in which:

Figure 1 shows semi-schematically control apparatus embodying this invention for measuring the moisture characteristics of a paper web and controlling the temperature of the web drying rolls;

Figure 2 shows diagrammatically electrical and mechanical connections in the various parts of the control apparatus shown in Figure 1, with certain of the elements of the apparatus shown semi-schematically in perspective;

Figure 2a is a simplified diagram of part of the control apparatus shown in Figure 2;

Figure 3 shows a side view of the electro-pneumatic control valve shown in Figure 2, partly in elevation and partly in section;

Figure 4 shows a side view partly in elevation and partly in section of the electro-pneumatic valve taken on line 4—4 of Figures 3 and 5;

Figure 5 shows a top view partly in elevation and partly in section of this electro-pneumatic valve taken on line 5—5 of Figures 3 and 4;

Figure 6 is a perspective of the condenser unit containing a pneumatically operated variable condenser shown in Figure 2, partly broken away to show more clearly its internal structure;

Figure 7 is a sectional view of this condenser unit taken on line 7—7 of Figure 6; and Figure 8 is a side view partially broken away to show a section of an electrical condenser type of hygrometric element used in the control apparatus shown in Figure 2.

In Figure 1 apparatus embodying the present invention is shown as applied to the control of the temperature of drying rolls of a paper drier in response to the moisture condition of the paper, although the invention could be applied to the measurement and/or control of other processes. Referring to Figure 1, the rolls 2 and 4 represent the last few drying rolls of the drier section of the usual paper making machine. A moving paper sheet 8 formed at the wet end of the machine passes in the direction shown by the arrow over a series of drying rolls, including these last few rolls 2 and 4. Thence the sheet is calendered and reeled in the usual manner. The moisture content of the paper sheet 8 leaving the paper machine is controlled by controlling the temperature of the drying rolls 2 by regulating the supply of steam to the rolls.

Methods for determining the moisture condition of the paper are known and one method such as that described in the Allen Patents Nos. 1,708,073 and 1,708,074 is satisfactory. The apparatus described in the present embodiment makes use of this latter method. In this apparatus there is located between the last two drying rolls 2 and 4 a hygrometer unit 16, suitably supported, which unit varies the electrical characteristics of an electrical circuit in response to the moisture condition of the sheet 8. This electrical variation is transmitted through a cable 22 to an instrument, generally indicated at 24, which, in accordance with the present invention, converts this electrical characteristic variation into a pneumatic pressure. This pneumatic pressure is then transmitted through a line 28 to a control instrument, generally indicated at 30, which may be calibrated to record the pressure in terms of the moisture condition of the sheet. The control instrument 30 may be of any known type; suffice it to say that it controls the application of air pressure through a pipe 31 to a diaphragm motor 32 operating a valve in the steam supply line 14. The line 14 is connected with a header 12 from which the steam flows through branch lines 10 to the various drying rolls. As is usual in paper manufacture, the control of the moisture condition of the web is largely obtained by controlling the temperature of all of the drying rolls of the paper machine, and thus Figure 1 is incomplete in this respect since it shows only a few of the rolls at the dry end of the machine.

The essential elements and operations of the electro-pneumatic apparatus 24, shown generally in Figure 1, may be more readily understood by referring to the simplified diagram shown in Figure 2a. This control system may be considered as including four units: a condition sensitive unit, generally indicated at 16; a condition responsive circuit which, in the present embodiment, is a tuned resonant circuit, generally indicated at 60; a follow-up circuit shown here as a pneumatically-controlled oscillator, generally indicated at 44; and an electro-pneumatic control valve, generally indicated at 48, which controls the follow-up circuit to maintain it in predetermined relationship to condition responsive circuit 60. The condition sensitive hygrometer unit 16 contains a circuit including hygrometric condenser elements 17, whose capacities change with variation of moisture in sheet 8. The capacity changes of these elements 17, communicated through a suitable transmission cable 22 to the instrument 24, effectively determine the resonance frequency of resonant circuit 60. The oscillator circuit 44, whose oscillation frequency is varied by a pneumatically-controlled variable condenser, generally indicated at 74, supplies energy at this frequency to circuit 60 through a coupling condenser 72. A voltage is thus developed across circuit 60 which is proportional to the difference between the frequency of oscillator 44 and the resonance frequency of circuit 60. This voltage is impressed on a vacuum tube 50 which controls the current to the magnetically operated electro-pneumatic control valve 48, which in turn controls the fluid pressure impressed on the pneumatically-operated variable condenser 74 to adjust the frequency of oscillator 44 so that it always maintains a predetermined relationship with respect to the resonance frequency of circuit 60. In the present embodiment this relationship is a predetermined frequency differential between these circuits. Thus, this fluid pressure is proportional to the moisture in paper sheet 8 because the fluid pressure is proportional to the frequency of oscillator 44, the frequency of oscillator 44 is proportional to the resonance frequency of circuit 60, and the latter is proportional to the moisture in sheet 8.

Referring to Figure 2, which shows diagrammatically in greater detail the elements comprising the electro-pneumatic system 24, shown only generally in Figure 1 and in simplified form in Figure 2a, the hygrometer unit 16 comprises two hygrometric condenser elements 17 mounted in a box-like construction 18, hereinafter referred to as the hygrometer shoe, closed on five sides and open on the sixth side which side is exposed to the paper sheet, as shown in Figure 1. Each hygrometer element 17 comprises essentially two condenser plates between which plates is mounted a hygrometric material such as unreverted cellulose, commonly called "artificial silk."

A suitable hygrometer element is shown in detail in Figure 8, the element comprising an inner metal tube 810 which forms one plate of the hygrometric condenser. Mounted in either end of the tube are cylindrical hubs 812 and 814 formed from insulating material. The hubs have shoulder portions 816 of sufficient height so that the outer surface of the tube 810 is substantially flush with the periphery of the shoulder portions. The hubs are provided with grooves 818 adjacent the shoulders 816. Laid along the outer surface of the tube 810 are the artificial silk threads 820, the ends of the threads being secured to the hubs by binding threads 822 lying in the grooves 818. Over the structure thus described is slipped a skeletonized metal tube 824 which forms the other plate of the condenser. The tube 824 is secured with respect to the tube 810 at either end by pins 826 which pass through the hubs. The skeletonized character of the outer tube 824 permits the artificial silk to assume rapidly a moisture condition which is in equilibrium with the atmosphere surrounding it. Each hygrometer element 17 is supported in the hygrometer shoe, as shown in Figure 2, by means of bracket 828 secured to the outer tube 824. These brackets also form an electrical connection to the outer condenser plate.

As described in the Allen Patent 1,708,073, when a hygrometric unit such as just described is placed in operative relation with a running paper sheet, as shown in Figure 1, the sheet passing over and effectively closing the open side of the shoe, the artificial silk in each hygrometer element assumes a moisture condition comparable to that of the paper sheet. Changing the moisture content of the artificial silk varies its dielectric constant and hence varies the capacity of the condenser.

Referring again to Figure 2, the variation of the capacity of the two hygrometric condenser elements 17 is used to vary the resonance frequency of a tuned circuit. To this end the two hygrometric condenser elements 17 are connected in parallel across a coupling coil 54 to form a resonant circuit by connecting the two inner plates of the condensers to the left end of coil 54 and the outer plates to the right end of the coil. The resonance frequency of this circuit varies with the variation of the capacity of the elements 17. A manually variable "padding" condenser 56 is also connected in parallel with coil 54 so that the exact capacity connected across coil 54 may be adjusted manually at the factory.

This tuned circuit is connected by a transmission cable 22 to another resonant circuit 60. The transmission cable 22 comprises two conductors 66 and 68 and may be any suitable cable such as a twisted "pair" or a coaxial cable. Conductor 66 connects the right-hand end of coil 54 and the frame of the hygrometer shoe 18 to one end of coil 62 and to the grounded portion of the control apparatus. Conductor 68 connects a tap 58 at some intermediate point on coil 54 to a tap 70 at a corresponding intermediate point on coil 62. This coupling circuit arrangement is substantially aperiodic. It effectively reflects the capacity of the hygrometric elements 17 through cable 22 so that they effectively tune the resonant circuit 60, including the coil 62 and the fixed condenser 64, to a resonance frequency which varies with changes in the effective reflected capacities of these hygrometric elements 17 caused by changes in the moisture content of sheet 8. Reference may be made to my United States Patent No. 2,074,396 for further details with respect to circuit arrangements and adjustments for obtaining this effect.

Resonant circuit 60 is coupled to oscillator circuit 44 through condenser 64, as shown in the diagram and the circuit 60 receives its power from the oscillating circuit. The oscillating circuit 44 may be of any suitable type of radio frequency oscillator. In the present embodiment a standard self-excited oscillator is used. The tank circuit of the oscillator is composed of the variable condenser 74, the semi-fixed condenser 78 and the coil 76, and is connected through a coupling condenser 80 to the plate circuit of an oscillator tube 52. The tank circuit is coupled to the grid of the oscillator tube 52 by means of another coil 82 in the grid circuit of the tube inductively coupled to the coil 76. As above pointed out, the frequency of the oscillator circuit may be varied by means of the variable condenser 74.

The variable condenser 74 is located in the capacity unit 46, which, as is more clearly shown in Figures 6 and 7, includes also the fixed condensers 64 and 72, this being for purposes of convenience in manufacture. The outer sides of the capacity unit comprise a back-plate 602 in a front-plate 604, both of which are relatively stiff and of some resilient metal, such, for example, as beryllium-copper. These plates at their bases are rigidly secured together by spacer bars 606 and 608, and bolts 610.

Mounted intermediate plates 602 and 604 and clamped between spacer bars 606 and 608 is a third resilient rectangular metal plate 612, more flexible than plates 602 and 604 and substantially coextensive therewith. A series of holes 654 are provided in this plate running in a row from one side of the plate to the other in a line just above the place where it is clamped. These holes reduce the rigidity of plate 612 at this point so that when force is applied to it above these holes the major portion of the resulting bending occurs along this line. Plate 612 is given a permanent set in the direction of front-plate 604 so that its free end normally tends to rest against the free end of plate 604.

The bolts 610 pass through a clamping plate 614, plate 604, spacer bar 608, intermediate plate 612, spacer bar 606, plate 602, and thread into a second clamping plate 616 to hold these various elements rigidly in fixed relation to each other. A hole 618 is provided in spacer bar 606 to lighten it.

A suitable fluid pressure operated bellows 620, such, for example, as that type of corrugated metallic bellows now sold under the trade name of "Hydron," is mounted between plates 602 and 604 near their bases and passes through a hole 628 in the intermediate plate 612 without contacting it. This Hydron 620 is held in position at its right-hand end by two pins 622 seating in holes 624 in the inner face of front-plate 604. Its left-hand end is secured to plate 602 by means of a pipe 626 passing through back-plate 602 and through which pipe the air pressure is varied in Hydron 620 to expand and contract it during operation of the instrument, thus causing the two plates 602 and 604 to move toward and away from each other and vary the frequency of the oscillator circuit 44. The positioning of this Hydron near the point where the two plates 602 and 604 are fastened together permits a large movement of the free ends of these plates in response to a small expansion or contraction of the Hydron. The size of the Hydron, its location, and the rigidity of the end plates determine the motion which will result from a given change of air pressure.

Mounted on back-plate 602 between it and the intermediate plate 612 are three strips 630 of insulation material. These insulation strips 630 act as insulating supports for condenser plates 644 and 646. Plate 646 together with back-plate 602 forms the fixed condenser 64 of circuit 60, and plate 644 and the flexible intermediate plate 612 form the pneumatically operated variable condenser 74, and plates 644 and 646 form the other fixed condenser 72 of circuit 44.

One end of each of the strips 630 is rigidly attached to the back-plate 602 by means of screws 632 which pass through plate 602, sleeves 634, and the insulation strips 630 where they are held by nuts 636. A lug 637, fastened under one of the nuts 636, is provided for making an electrical connection to the main or grounded portion of the condenser unit 46, i. e., to plates 602, 604, and 612. The other ends of the insulation strips 630 are also fastened to back-plate 602 by means of U-shaped metal brackets 638 attached to back-plate 602 by screws 640 and to insulation strips 630 by screws 642. It should be noted that the two end insulation strips are attached to back-plate 602 by posts at their upper ends and by brackets at their lower ends, whereas the center strip is attached to back-plate 602 by a post at its lower end and a bracket at its upper end. This particular structure, because of the provision of the slightly resilient metal brackets 638, permits the insulation strips 630 to be held in a fixed position between back-plate 602 and intermediate plate 612 in spite of slight expansion and contraction of the various parts due to change in ambient temperature and motion of the parts due to flexing of the end plates 602 and 604.

Condenser plate 644 is a rectangular metal plate smaller than the plates 602 and 604. It is mounted at a fixed distance from back-plate 602 and insulation strips 630 by spacers 650, and is held in place by three screws 648, each passing through one of the insulation strips 630. Thus condenser plate 644 is mounted in fixed spaced relationship to back-plate 602 so that it moves toward and away from front-plate 604 as the pressure in Hydron 620 is varied. A lug 652 fastened under one of the spacers 650 provides means for making an electrical connection to this condenser plate 644. An adjustment screw 656, threaded through a hole in the front-plate 604, is provided to adjust the distance between plates 644 and 612 as determined by the positions of front and back plates 604 and 602. As plate 612 is given a permanent set toward front-plate 604, adjustment of screw 656 merely adjusts plate 612 with reference to plate 604. A ball bearing 658 is mounted in the tip of screw 656 to reduce to a minimum the sliding friction between the tip of the screw and plate 612 caused by the slight transverse motion therebetween as the two plates 602 and 604 move toward and from each other. This freedom from friction effects at this point is desirable for proper operation to obtain the fine adjustment needed between circuits 60 and 44 for accurate operation.

The other condenser plate 646 supported by the insulation strips 630 is formed of a rectangular piece of metal of approximately the same size as condenser plate 644. It is mounted in a similar manner by means of screws 660, spacers 662, and nuts 664 on the other side of the insulation strips 630, in between these strips and end plate 602 and is closely disposed thereto. A lug 666, held in place by one of the nuts 664, provides means for making an electrical connection to this condenser plate 646. As shown in Figure 6, condenser plate 646 is cut away at the back to permit the passage of brackets 638 and spacer posts 634 on which the insulation strips 630 are mounted, so that electrical contact is not made at these points between these supports and plate 646. Plates 646 and 644, which form the coupling condenser 72, are relatively widely spaced so as to provide only a small capacity therebetween which is all that is required for such a coupling condenser.

The spring-opposed Hydron motor arrangement for operating the variable condenser 74 by moving a condenser plate about a resilient axis provides for varying the capacity of the condenser without lost motion and friction in the moving parts. This makes possible a rapid and accurate tuning of the oscillator circuit 44 as will be described.

Referring again to Figure 2, the capacity unit 46 is connected in the electrical circuits 60 and 44. The frame of the condenser unit including end plates 602 and 604 and intermediate plate 612, which electrically are all one piece, are connected to the ground potential of these electrical circuits. The condenser unit itself may be suitably attached to the frame of the instrument which is also preferably at ground potential.

The condenser 64 is connected in circuit 60 by connecting back-plate 602 to one side of inductance 62, in the manner above described, and plate 646 to the other side of coil 62. Plate 644, which, together with intermediate plate 612, forms the pneumatically-controlled variable condenser 74, is connected to one side of an inductance 76 which is the tank coil of the oscillator circuit 44. The other end of this coil 76 is connected to ground. This tank coil 76 is also shunted by a semi-variable "padding" condenser 78. Thus the capacity of the pneumatically-controlled variable condenser 74 and condenser 78, and the inductance of coil 76 determine the oscillation frequency of oscillator 44.

The resonant circuit 60, whose resonance frequency is determined by the moisture condition of sheet 8, is coupled to the oscillator circuit 44 by a coupling condenser 72. Thus, the approximately constant output voltage of oscillator 44 is impressed across a circuit formed by a fixed impedance, coupling condenser 72, connected in series with a variable impedance, resonant circuit 60, so that voltages are developed across each of these impedances. The impedance of resonant circuit 60 varies with the relationship between the natural resonance frequency of circuit 60 and the oscillation frequency of oscillator circuit 44, and therefore the voltage developed across circuit 60 is a measure of this relationship. Thus, for example, as the oscillator frequency is changed to approach more closely the resonance frequency of circuit 60, the impedance of circuit 60 increases and thus the portion of oscillator output voltage developed across this circuit also increases. This voltage is impressed on a vacuum tube 50 by connecting the grid circuit of this tube, which may be termed an amplifier tube, across resonant circuit 60. The variable condenser 74, which controls the frequency of oscillation of oscillator 44 is regulated in response to changes in the plate current of tube 50 to tune oscillator 44 to a frequency bearing a predetermined relative value with respect to the frequency of circuit 60. When reference is made to the frequency of circuit 60, its natural or resonance frequency is meant and not the frequency of the alternating current impressed on it at the oscillation frequency of oscillator 44, which latter frequency is of course the same as that of the oscillator 44.

Operating potentials for the tubes 50 and 52 are supplied from an alternating current supply line 25 through a transformer 84 having a primary winding 86, two high potential secondary windings 88 and 90, and two low potential secondary windings 92 and 94. The low potential secondary windings 92 and 94 supply the current for heating the filaments of tubes 52 and 50, respectively. One side of the high potential secondary winding 88 is connected to the plate of vacuum tube 50 through a radio frequency choke 96 to supply an unfiltered alternating plate potential thereto. The plate circuit of this tube is completed by a connection from the other side of secondary winding 88 through one coil 102 of the electro-magnet pneumatic valve 48 (hereinafter to be described in greater detail), through a resistance 106 back to the filament circuit of the tube. A by-pass condenser 100 is connected between the plate of amplifier tube 50 and the ground in order to by-pass radio frequency currents which are transmitted thereto through the tube. One side of the other high potential secondary winding 90 is connected to the plate of oscillator tube 52 through a radio frequency choke 98 to supply it with an unfiltered alternating plate potential, and the plate circuit of this tube is completed by a connection from the other side of secondary winding 90 through the other coil 104 of the valve 48, and a resistance 108 back to the filament circuit. A by-pass condenser 110 is connected across relay winding 102 and resistance 106, and another by-pass condenser 112 is connected across relay winding 104 and resistance 108 to act as a filter to by-pass the cyclic components of the plate currents of tubes 50 and 52 around the high alternating current impedances of these windings 102 and 104.

Grid leaks 114 and 116, shunted by fixed condensers 118 and 120, respectively, are connected in the grid returns of vacuum tubes 50 and 52 in such a manner that the grid current of oscillator tube 52 passes through both grid resistances 114 and 116, and the grid circuit of amplifier tube 50 is connected to the junction of resistances 114 and 116 so that it is supplied with a suitable grid bias less than that impressed on oscillator tube 52. This grid return circuit arrangement provides an approximate compensation for line voltage variations. When the line voltage increases, thereby increasing the output of the oscillator 44 and thus its grid current, this increase in grid current flows through the resistor in the grid circuit of amplifier tube 50. This increases the negative grid bias on this tube and thereby decreases its plate current by a proportionate amount. Within certain limits, all other variables being fixed, this effect maintains the plate current of the amplifier tube 50 approximately proportional to the plate current of the oscillator tube 52 regardless of variations in the voltage of line 25.

With this arrangement the right-hand coil 104 of the valve 48 is supplied with a substantially constant current whereas the current supplied to the left-hand coil 102 varies with frequency relationship of the circuits 60 and 44. As will hereinafter be described, this electro-pneumatic valve 48 may be adjusted so as to prevent the resonance frequency relationships between the circuits 60 and 44 from coming to equilibrium at any but a desired value. In other words, the frequency of circuit 44 is caused to follow the resonance frequency of circuit 60 which in turn varies with the moisture condition of sheet 8.

The electro-pneumatic valve 48 will now be described. Referring to Figures 3, 4, and 5, it comprises the two solenoids 102 and 104 and a movable armature 332 which positions a flapper 360 of a pneumatic control couple relative to a nozzle 356. The two solenoids 102 and 104 surround soft iron cores 322 and 324 which are attached at one end to a yoke 326 fastened to a base member 328. Four binding posts 330 are mounted on the base 328 to which the terminals of solenoids 102 and 104 are connected. These binding posts 330 in turn are connected in the electrical circuit of the instrument in the manner above described, as shown in Figure 2. The upper ends of cores 322 and 324 are joined by a strip 334 of non-magnetic material fastened thereto by nuts 336 threaded onto the ends of cores 322 and 324. Secured to strip 334 by screws 340 is a right angle bracket 338 of non-magnetic material, the vertical flange of which extends from front to back between cores 322 and 324. The front and back ends of the vertical flange of the angle bracket 338 supports flat metal springs 342 extending upwardly parallel to the downwardly extending portion of bracket 338. The upper ends of the springs 342 support a square cross-bar 344 of non-magnetic metal, and it is this crossbar that supports the armature 332 fastened to the bar by screws 346. This structure effectually pivots the armature 332 about a resilient axis midway between the upper ends of cores 322 and 324 so that, when one end of the armature is drawn toward its pole, the other end of the armature moves away from the other pole. Adjustment screws 348 are provided at either end of the armature opposite the pole pieces to permit the limits of motion of the armature to be adjusted as desired.

Secured to the yoke 326 at the base of the cores 102 and 104 is a lug 352 having a vertical flange in back of the cores. Secured to this vertical flange by means of a clamp 351 and extending vertically upward from the vertical flange is an L-shaped iron bar 350 which at its top bends forwardly to extend above and between the cores 104 and 102 and above the armature 332. This iron bar forms a magnetic path from the lower end of the solenoid cores to a point immediately above the armature 332 thereby concentrating the magnetic field into a path through the armature to the pole pieces 322 and 324 and minimizing the stray magnetic field.

Secured to vertical flange of right angle bracket 338, and extending downwardly is a rigid strip 354, supporting the nozzle 356 of a pneumatic control couple or valve at its lower end. The flapper element 360 of this pneumatic control valve comprises a strip of resilient metal 360 extending down from the front end of bar 344 parallel to one of the springs 342. This flapper element 360 is backed by a more rigid metal strip 362 to the end of which is secured an adjustment screw 364 whereby the distance between the flapper and the nozzle can be adjusted with respect to any given position of the armature 332.

This entire assembly is provided with a cap-like rectangular cover 366 which fits snugly against a shoulder 368 on base 328 and is held in place by screws 370 attached to the ends of the support strip 334.

Referring again to Figure 2, the air pressure supply line 26 is connected through a restriction 122 to the nozzle 356 of the electro-pneumatic valve 48. The nozzle 356 is also connected through a pipe 124 to the operating Hydron 620 of the air-operated condenser 74. This connection is preferably unrestricted and as short as possible. Due to the restriction 122 the air pressure in pipe 124 behind the nozzle 356, and thus the air pressure in Hydron 620, may be varied by varying the position of the flapper 360 with respect to nozzle 356. The operation of the instrument, as will be hereinafter described, always tends to make the average pressure in line 124 proportional to the value of the condition, i. e., to the moisture content of the sheet 8, and this air pressure, therefore, may be used to operate an indicating, recording, and/or controlling instrument calibrated in terms of the moisture condition of the sheet 8.

In operation the current supplied to the right-hand solenoid 104 is constant, whereas the current supplied to the left-hand solenoid 102 varies with the difference between the frequencies of circuits 60 and 44. However, there is substantially only a very narrow current range, or effectively only one current value, and so only a very narrow range of frequency differential, or effectively only one frequency differential, that will maintain the flapper and nozzle within the range of their normal operating positions, which range is less than their maximum effective range of motion, i. e., less than that movement which would push the flapper against the nozzle or move it away from the nozzle the short distance which tends to produce minimum back pressure in line 124.

For this reason the Hydron 620 is always tending to maintain the variable condenser 74 in such position that the frequency of circuit 44 is such as to be within the above-mentioned very narrow frequency difference range with respect to the frequency of circuit 60.

Thus, although the flapper-nozzle electric-control valve 48 with its electrically operated solenoids is relatively unstable and may be without accurate characteristics, the instrument will nevertheless bring about the frequency differential balance in maintaining a steady state. Any overaction on the part of the flapper-nozzle valve is immediately corrected for by the variable condenser 74 which, responding with negligible time delay, does not itself take up a period of oscillation. The characteristics of the flapper and nozzle as a pneumatic control valve are such that only a slight movement of the flapper 360 with respect to the nozzle 356 is required to produce the maximum operating change of air pressure back of the nozzle. For this reason the Hydron 620 causes the variable condenser to keep the frequency of the oscillator 44 always at such a value that the difference between the circuits 60 and 44 is in the above-mentioned narrow differential range.

As mentioned above, the electro-pneumatic valve 48 is essentially a device responsive to the difference in frequency between oscillator 44 and resonant circuit 60. This differential response is obtained because the current through solenoid 102 is proportional to the variable voltage across resonant circuit 60; whereas the plate current of oscillator 44 which flows through solenoid 104 is substantially constant, assuming that the variables such as the voltage of the line 25 remain approximately constant. Thus the armature 332 effectively responds only to variations in the pull on the controlling solenoid 102 and therefore to the frequency differential between circuits 44 and 60. However, because of variables, such as variations in line voltage and ambient temperature, it is not desirable to oppose the pull of control solenoid 102 on armature 332 merely by a spring or some similar force, because the pull of control solenoid 102 also changes with these variables. Therefore, two solenoids, the control solenoid 102 and a compensating solenoid 104 are used in the electro-pneumatic valve 48 to compensate for these variables. For example, although it is true, as hereinbefore mentioned, that the plate current of oscillator 44 is substantially constant at all times, this is only true if the voltage in line 25 remains approximately constant. If the voltage of line 25 decreases the plate current of oscillator 44 decreases, but, because of the similarity in the characteristics of the circuits of oscillator tube 52 and amplifier tube 50, the plate current of amplifier tube 50 also decreases by approximately the same amount, but the relationship between the two remains approximately constant. Thus, by providing the additional compensating solenoid 104 actuated by the plate current of oscillator tube 50, an approximately constant differential pull is maintained on the armature 332 in spite of line voltage variations. This provides another means, in addition to the use of two grid resistors 114 and 116, for obtaining compensation for these variations.

In considering the operation of the instrument, as above described, the interrelated operation of the various elements of the instrument will be described in a static sense, although in the actual operation the various elements do not function in the step-by-step manner described, but instead function simultaneously in an interrelated and coordinated manner so that many of the steps in the operation which are described as separate and distinct actions actually are all part of a single operation.

To trace an operation we will assume first that the various circuits are in equilibrium with respect to each other, i. e., that the frequency of circuit 60 is constant and that the variable condenser 74 is tuning the oscillator circuit 44 to a frequency that maintains a differential between the frequencies of circuits 44 and 60, which differential is just sufficient to hold the plate current of amplifier tube 50 and thus the current through solenoid 102 at such a value as to maintain the nozzle and flapper in such a relative position that the pneumatic pressure in Hydron 620 is just sufficient to cause condenser 74 to tune oscillator 44 to this frequency. Under this condition the pneumatic pressure existing back of the nozzle and in Hydron 620 bears an exact relationship to the frequency of circuit 60 which is proportional to the moisture condition of paper sheet 8.

Assume now that the paper sheet increases in moisture content to increase capacity of the hygrometric condenser elements 17. This changes the frequency of the circuit 60 a definite amount. This decrease in the frequency of the circuit 60 upsets the equilibrium, i. e., the frequency differential that has been maintained between the frequency of the circuits 60 and 44, and increases the current supplied to the solenoid 102 which causes the flapper of the valve to move away from the nozzle so that the air pressure back of the nozzle and in the Hydron 620 starts to decrease. But as the pressure in the Hydron 620 starts decreasing the variable condenser starts decreasing the frequency of the circuit 44 to reduce the amount of unbalance and to restore the predetermined difference between the frequencies. This action is very rapid and hence the instrument tends to cause the circuit 44 to follow the frequency change of the circuit 60 practically instantaneously and so to cause the air pressure in the line 124 to follow proportionally the change in the moisture. The action of the electrical circuits is so fast that, if the Hydron 620 causes the variable condenser 74 to overcontrol even slightly, the nozzle-flapper arrangement is practically instantaneously reversed. In actual operation the flapper may actually have a rapid period which, however, is not transmitted to the Hydron 620 and is not felt in the line 124.

In this manner the response of an electrical condition-sensitive means is instantaneously transformed into a directly proportional and continuously responsive air pressure. This proportionality and direct and instantaneous responsiveness is due to the fact that the entire system is effectively frictionless. There is no friction or deadspace, and therefore no lag, in the response of the air-operated variable condenser 74 because of the pressure-operated spring-opposed Hydron drive arrangement used to operate this variable condenser which dispenses with surface or pivot friction in the moving parts. Likewise, the use of the spring support arrangement as a resilient pivot for the armature 332 provides a mounting for this moving member free from pivot or bearing friction. Furthermore, because of the extremely small throttling range of a flapper and nozzle arrangement, such as is used in the electro-pneumatic control valve 48, the deviation from direct proportionality makes available in the line 124 the full maximum or minimum pressures of air pressure supply 26, thus insuring powerful and instantaneous response to variations in the conditions being controlled.

Numerous factory adjustments are provided in the instrument to permit preliminary adjustments and sensitivity variations to be made when necessary. The padding condenser 56 in the hygrometer shoe 18 permits proper adjustment of the tuned circuit in the hygrometer shoe and also permits readjustment of this circuit when it is necessary to replace either the hygrometer units 17 or the cable 22. Set screw 656 in the condenser unit 46 is provided to adjust the ratio of air pressure change to change in the capacity of the air-operated variable condenser 74, and padding condenser 78 is provided to set the range of oscillator frequency variations and to compensate for changes in the capacity of condenser 74 caused by adjustment of screw 656. Adjustment screw 364 is provided on the flapper supporting member of the electro-pneumatic valve 48 to permit adjustment of the relative position between the flapper 360 and the nozzle 356 for any given position of armature 332.

In the present embodiment of this invention the controlled fluid pressure in pipe 124 is transmitted through pipe 28 to the pressure responsive recorder controller instrument 30. Such an instrument may be of any known type, such, for example, as the kind in which a pilot valve is operated by a pressure sensitive element, for example, a helical tube, to effectively control the application of a fluid, such as air, to the diaphragm-motor operated valve 32 in the steam line 14, as described. Whereas for paper machine control it is recognized that a particular type of controller may be necessary in some instances, the control instrument shown in the U. S. Reissue Patent No. 20,092 to C. E. Mason is illustrative of one of many kinds of instruments that might be used in conjunction with the electro-pneumatic instrument 24, above described.

In some instances, too, the controlled fluid pressure in pipe 124 may be used to operate a control valve directly or to a operate a valve positioner device, such as shown in the U. S. Reissue Patent No. 19,944 to E. H. Bristol.

In the embodiment herein described, the control apparatus is conveniently mounted in two instrument cases 24 and 30. However, where compactness and other requirements exist, the various elements of the control system may all be put in one casing to provide a single electric-to-pneumatic unit having a pen arm responsive to fluid pressure for recording the value of the condition measured by the electrical portion of the apparatus.

It should be understood that the foregoing description of certain embodiments of this invention has been given merely by way of example, and that many other modifications and changes might be made without departing from the spirit or scope of this invention as defined by the appended claims.

I claim:

1. A control instrument responsive to the value of a condition, comprising, in combination, condition responsive means including an electrical circuit having a frequency variable proportionally with the value of the condition, follow-up means including an electrical circuit having a controlled variable frequency, electro-responsive means for establishing a control electrical characteristic responsive to the relationship existing between the frequencies of said condition responsive means and said follow-up means, motor means responsive to said control characteristic for varying the frequency of said follow-up means to maintain it in a desired relationship with respect to the frequency of said condition responsive means, and control means operated in proportional response to the frequency of said follow-up means.

2. A control instrument responsive to the value of a condition, comprising, in combination, condition responsive means including an electrical circuit having a frequency variable proportionally with the value of the condition, follow-up means including an electrical circuit having a variable condenser controlling the frequency of said circuit, electro-responsive means responsive to the relationship existing between the frequencies of said condition responsive means and said follow-up means, motor means responsive to said electro-responsive means for varying said variable condenser to vary the frequency of said follow-up means to maintain it in a desired relationship with respect to the frequency of said condition responsive means, and control apparatus operated in proportional response to the capacity of said variable condenser.

3. A control instrument responsive to the value of a condition, comprising, in combination, condition responsive means including an electrical resonant circuit having a resonance frequency variable proportionally with the value of the condition, follow-up means including an oscillator circuit having a controlled oscillation frequency, electro-responsive means responsive to the relationship existing between the frequencies of said resonant circuit and said oscillator, motor means responsive to said electro-responsive means for varying the frequency of said oscillator to maintain it in a desired relationship with respect to the resonance frequency of said resonant circuit, and control means operable in proportional response to the frequency of said oscillator.

4. A control instrument responsive to the value of a condition, comprising, in combination, condition sensitive means having an electrical capacity variable proportionally with the value of the condition, an electrical resonant circuit, means for coupling said condition sensitive means to said resonant circuit so that the capacity of said condition sensitive means effectively determines the resonance frequency of said resonant circuit, an oscillator coupled to said resonant circuit and having a variable condenser for controlling the oscillation frequency, means responsive to the differential between the frequencies of said resonant circuit and said oscillator, and motor means controlled by said responsive means for operating said variable condenser to vary the frequency of said oscillator to maintain a desired differential between it and the resonance frequency of said resonant circuit.

5. A control instrument responsive to the value of a condition, comprising, in combination, an electrical resonant circuit having a resonance frequency variable proportionally with the value of the condition, an oscillator coupled to said resonant circuit for developing a voltage thereacross proportional to the differential between the frequencies of said resonant circuit and said oscillator, a variable condenser for controlling the frequency of said oscillator, pneumatic motor means for operating said variable condenser, and an electro-pneumatic valve responsive to the voltage across said resonant circuit for controlling the supply of pneumatic pressure to said motor means whereby said motor means varies the frequency of said oscillator to maintain a desired differential between it and the resonance frequency of said resonant circuit.

6. A control instrument responsive to the value of a condition, comprising, in combination, an electrical resonant circuit having a resonance frequency variable proportionally with the value of the condition, an oscillator coupled to said resonant circuit for developing a voltage thereacross proportional to the differential between the frequencies of said resonant circuit and said oscillator, a variable condenser for controlling the frequency of said oscillator, pneumatic motor means for operating said variable condenser, a soleloid responsive to the voltage across said resonant circuit, an armature moved by the magnetic attraction of said solenoid, and a flapper and nozzle pneumatic valve operated by said armature for controlling the supply of pneumatic pressure to said motor means whereby said variable condenser varies the frequency of said oscillator to maintain a desired differential between it and the resonance frequency of said resonant circuit.

7. A control instrument responsive to the value of a condition, comprising, in combination, an electrical resonant circuit, condition sensitive means for determining the resonance frequency of said resonant circuit, an oscillator coupled to said resonant circuit for developing a voltage thereacross proportional to the differential between the frequencies of said resonant circuit and said oscillator, a variable condenser for controlling the frequency of said oscillator, pneumatic motor means including a spring-opposed pneumatic bellows for operating said variable condenser, a solenoid responsive to the voltage across said resonant circuit, an armature moved by the magnetic attraction of said solenoid, and a flapper and nozzle pneumatic valve operated by said armature for controlling the supply of pneumatic pressure to said motor means whereby said variable condenser varies the frequency of said oscillator to maintain a desired differential between it and the resonance frequency of said resonant circuit.

8. An instrument for recording the value of a condition being measured by an electrical condition sensitive means, comprising, in combination, an instrument casing, an electrical condition sensitive means, condition responsive means including an electrical circuit having electrical characteristics variable proportionally with variations of said condition sensitive means, follow-up means including an electrical circuit having a controlled variable electrical characteristic, pneumatically-operated motor means for varying the electrical characteristic of said follow-up means, a pneumatic control valve for controlling the supply of fluid pressure to said motor means, electro-responsive means for operating said pneumatic control valve in response to the relationship existing between the values of the electrical characteristic of said condition responsive means and said follow-up means to cause said motor means to vary the electrical characteristic of said follow-up means to maintain it in a desired relationship with respect to the electrical characteristic of said condition responsive means, and pressure operated means for recording the value of said fluid pressure.

9. In a control instrument continuously responsive to the value of a condition, in combination, condition responsive means, a variable condenser operable in response to variations of said condition responsive means, said condenser having at least one plate mounted to move about a resilient axis, a fluid pressure operated motor including fluid pressure operated diaphragm means for operating said condenser, and a fluid pressure control valve for controlling the fluid pressure supplied to said motor, said control valve comprising flapper and nozzle members, at least one of which is movable, and means for mounting said movable valve member on a resilient axis.

10. The combination with a control instrument including an electrical circuit having an electrical characteristic automatically varied to follow the variations of a condition, of a variable condenser for so varying said characteristic and comprising at least two condenser plates electrically insulated from each other and relatively movable with respect to each other, resilient means for opposing relative movement of said plates, and pneumatically operated motor means for moving said condenser plates against the action of said resilient means for varying the relative position of said plates and thus the electrical capacity therebetween.

11. The combination with a control instrument including an electrical circuit having an electrical characteristic automatically varied to follow the variations of a condition, of a variable condenser for so varying said characteristic and comprising at least two condenser plates electrically insulated from each other and relatively movable with respect to each other about resilient axes, and pneumatically operated motor means for moving said condenser plates against the action of said resilient axes for varying the relative spacing between said plates and thus the electrical capacity therebetween.

12. The combination with a control instrument including an electrical circuit having an electrical characteristic automatically varied to follow the variations of a condition, of a variable condenser for so varying said characteristic, and comprising at least two condenser plates electrically insulated from each other and relatively movable with respect to each other, spring means urging relative movement of said plates, and fluid pressure operated diaphragm means for moving said condenser plates against the action of said spring means to vary the relative spacing between said plates and thus the electrical capacity therebetween.

13. The combination with a control instrument, including, an electrical circuit having an electrical characteristic automatically varied to follow the variations of a condition, of a variable condenser for so varying said characteristic and comprising at least two condenser plates electrically insulated from each other and relatively movable with respect to each other, pneumatically operated motor means for moving said condenser plates to vary the relative positions of said plates and thus the electrical capacity therebetween, and means for varying the ratio of change in pneumatic pressure to change in electrical capacity to predetermine the sensitivity of the control instrument.

14. For use in an electro-pneumatic control instrument for converting an electrical value into a pneumatic value, an electro-pneumatic control valve, comprising, in combination, a solenoid, an armature associated with said solenoid, means for resiliently mounting said armature to yieldingly move in proportional response to changes in the magnetic attraction of said solenoid, a pneumatic control valve comprising flapper and nozzle members, at least one of which is movable, and means for mounting said movable member in rigid connection with said armature to operate said flapper and nozzle members in continuous response to the magnetic attraction of said solenoid.

15. For use in an electro-pneumatic control instrument for converting an electrical value into a pneumatic pressure value, an electro-pneumatic control valve, comprising, in combination, two solenoids having cores of magnetic material mounted with their axes parallel, a yoke of magnetic material joining corresponding ends of said cores, an armature extending across the other ends of said cores, means for resiliently mounting said armature to pivot about an effective axis intermediate said ends of said cores and perpendicular to the plane of the axes of said solenoids, and a pneumatic control valve operated by movement of said armature comprising flapper and nozzle members, at least one of which is movable, and means for mounting said movable member in rigid connection with said armature whereby the relative position of said flapper and nozzle members is determined by the position of said armature.

16. In a control instrument for converting an electrical value into a fluid pressure control effect, the combination with an electrical circuit connected to a source of electrical power of an electric-to-fluid pressure valve comprising a control solenoid, a compensating solenoid, an armature, said solenoids exerting opposing forces on said armature, said control solenoid being supplied with a current varying with a variable condition, said compensating solenoid being supplied with a current substantially unaffected by variations in said condition, and said control solenoid and said compensating solenoid being both effectively connected with said power supply line so that incidental variations including power supply variations which would otherwise distort the action of said control solenoid are negatived by the opposing effect of said compensating solenoid, and a fluid pressure control valve operated by movement of said armature whereby operation of said control valve is dependent solely upon change in the value of said condition.

17. An electro-pneumatic control instrument for converting an electrical value into a pneumatic value, including, in combination, an electrical condition sensitive means, an electrical circuit for producing an electrical current responsive to said condition sensitive means, an electro-pneumatic control valve responsive to said electrical current, comprising, a solenoid, an armature associated with said solenoid, means for resiliently mounting said armature to permit it to move in response to changes in the magnetic attraction of said solenoid, a pneumatic control valve operated by movement of said armature for establishing a pneumatic pressure, and pneumatic pressure operated control apparatus responsive to said pneumatic pressure.

18. The combination with a control instrument including an electrical circuit having an electrical characteristic automatically varied to follow the variations of a condition, of a variable condenser for so varying said characteristic and comprising at least two condenser plates electrically insulated from each other, resilient means for mounting at least one of said plates for movement relative to the other plate, and motor means smoothly and continuously responsive to operations of said control instrument for relatively moving said condenser plate against the action of said resilient means to vary the relative spacing between said plates and thus the electrical capacity therebetween.

19. A control instrument responsive to the value of a condition, comprising, in combination, condition responsive means including an electrical circuit having electrical characteristics variable proportionally with the value of the condition, follow-up means including an electrical circuit having a controlled variable electrical characteristic, a variable condenser for smoothly and continuously varying said follow-up electrical characteristic within the operating range, fluid pressure operated motor means for operating said variable condenser, electro-responsive means operative substantially instantaneously in response to changes in a predetermined relationship existing between the values of the electrical characteristics of said condition responsive means and said follow-up means, fluid pressure control valve means adapted to be operated through its full throttling range by a motion of said electro-responsive means which is less than the motion of said electro-responsive means caused by variations in the relationship existing between the values of the electrical characteristics of said condition responsive means and said follow-up means, said motor means being controlled by said control valve means to cause it to substantially instantaneously vary the capacity of said variable condenser to vary the electrical characteristic of said follow-up means to maintain it in the desired relationship with respect to the electrical characteristic of said condition responsive means.

20. A control instrument responsive to the value of a condition, comprising, in combination, condition responsive means including an electrical circuit having a frequency variable proportionally with the value of the condition, follow-up means including an electrical circuit having a controlled frequency, a variable condenser for smoothly and continuously varying said follow-up frequency within the operating range, fluid pressure operated motor means for operating said variable condenser, electro-responsive means operative substantially instantaneously in response to changes in a predetermined relationship existing between the frequencies of said condition responsive circuit and said follow-up circuit, fluid pressure control valve means adapted to be operated through its full throttling range by a motion of said electro-responsive means which is less than the motion of said electro-responsive means caused by variations in the relationship existing between the frequencies of said condition responsive circuit and said follow-up circuit, said motor means being controlled by said control valve means to cause it to substantially instantaneously vary the capacity of said variable condenser to vary the frequency of said follow-up circuit to maintain it in the desired relationship with respect to the frequency of said condition responsive circuit.

21. A control instrument responsive to the value of a condition, comprising, in combination, condition responsive means including an electrical circuit having electrical characteristics variable proportionally with the value of the condition, follow-up means including an electrical circuit having a controlled variable electrical characteristic, a variable condenser for smoothly and continuously varying said follow-up electrical characteristic within the operating range, a spring-opposed pneumatic bellows for operating said variable condenser, electro-responsive means operative substantially instantaneously in response to changes in a predetermined relationship existing between the values of the electrical characteristics of said condition responsive means and said follow-up means, a pneumatic control valve adapted to be operated through its full throttling range by a motion of said electro-responsive means which is less than the motion of said electro-responsive means caused by variations in the relationship existing between the values of the electrical characteristics of said condition responsive means and said follow-up means, said pneumatic bellows being controlled by said control valve to cause it to substantially instantaneously vary the capacity of said variable condenser to vary the electrical characteristic of said follow-up means to maintain it in the desired relationship with respect to the electrical characteristic of said condition responsive means.

22. A control instrument responsive to the values of a variable condition, comprising, in combination, means variable in response to the values of said condition for varying an electrical characteristic of an electrical circuit in proportion to the value of the condition, a second electrical circuit having a controlled variable electrical characteristic, follow-up means substantially free from mechanical friction for continuously varying said controlled electrical characteristic to maintain a predetermined relationship between the two electrical characteristics, substantially frictionless motor means for operating said follow-up means, electro-responsive means responsive to departure of said electrical characteristics from the said predetermined relationship, a source of power, control means directly connected to and controlled by said electro-responsive means for directly and instantly governing the supply of power to said motor means, means providing for relatively unrestricted and immediate operation of said control means by said electro-responsive means, and means for providing relatively unrestricted and immediate transmission of power change from said control means to said motor means whereby the action of said follow-up means in response to departure of said electrical characteristics from said predetermined relationship is substantially immediate.

23. A control instrument responsive to the values of a variable condition, comprising, in combination, means variable in response to the values of said condition for varying an electrical characteristic of an electrical circuit in proportion to the value of the condition, a second electrical circuit having a controlled variable electrical characteristic, follow-up means substantially free from mechanical friction for continuously varying said controlled electrical characteristic to maintain a predetermined relationship between the two electrical characteristics, fluid pressure-operated motor means including resilient positioning means for operating said follow-up means, electro-responsive means responsive to departure of said electrical characteristics from the said predetermined relationship, a source of fluid pressure, control valve means directly connected to and controlled by said electro-responsive means for directly controlling supply of fluid pressure to said motor means, means operatively connecting said electro-responsive means and said control valve means adapted to transmit immediately and relatively unrestricted control efforts of said electro-responsive means to said control valve means, and means for connecting said control valve means and said motor means to transmit relatively unrestricted and immediately fluid pressure change caused by said control valve means to said motor means whereby the response of said follow-up means to departure of said electrical characteristics from said predetermined relationship is substantially immediate.

24. A control instrument responsive to the values of the variable conditions, comprising, in combination, means variable in response to the values of said condition for varying an electrical characteristic of an electrical circuit in proportion to the value of the condition, a second electrical circuit having a controlled variable electrical characteristic, follow-up means substantially free from mechanical friction comprising a variable electric condenser having resilient means for positioning the plates thereof, said condenser being adapted to continuously vary said controlled electrical characteristic to maintain a predetermined relationship between said two electrical characteristics, fluid-pressure-operated motor means including resilient positioning means for operating said follow-up means, electro-responsive means responsive to the departure of said electrical characteristics from said predetermined relationship, a source of fluid pressure, control valve means directly connected to and controlled by said electro-responsive means for directly and immediately controlling supply of fluid pressure to said motor means in immediate response to the control efforts of said electro-responsive means, and means for connecting said control valve means and said motor means to transmit relatively unrestricted and immediately the fluid pressure changes caused by said control valve means to said motor means whereby the response of said variable condenser follow-up means to departures of said electrical characteristics from said predetermined relationship is substantially instantaneous.

25. For use in an electro-fluid control instrument for converting an electrical value into a fluid value, electro-fluid control means, comprising, in combination, electro-magnetic means, armature means associated with said magnetic means, means for resiliently mounting said armature means to yieldingly move in proportional response to changes in the attraction of said magnetic means, fluid control means having at least one movable member, and means for mounting said movable member in rigid connection with said armature means to operate said fluid control means to vary its control effect in continuous response to the attraction of said magnetic means.

WILFRED H. HOWE.